US012626042B2

(12) United States Patent
Yuan et al.

(10) Patent No.: US 12,626,042 B2

(45) Date of Patent: May 12, 2026

(54) SIDE CHANNEL LEAKAGE SOURCE IDENTIFICATION IN AN ELECTRONIC CIRCUIT DESIGN

(71) Applicant: RISCURE BEHEER B.V., Delft (NL)

(72) Inventors: Yao Yuan, Blacksburg, VA (US); Baris Ege, Delft (NL); Robert Patrick Schaumont, Blacksburg, VA (US); Tarun Kathuria, San Diego, CA (US)

(73) Assignee: RISCURE BEHEER B.V., Delft (NL)

( * ) Notice: Subject to any disclaimer, the term of this patent is extended or adjusted under 35 U.S.C. 154(b) by 708 days.

(21) Appl. No.: 18/001,759

(22) PCT Filed: Jun. 15, 2021

(86) PCT No.: PCT/EP2021/066096
§ 371 (c)(1),
(2) Date: Dec. 14, 2022

(87) PCT Pub. No.: WO2021/255019
PCT Pub. Date: Dec. 23, 2021

(65) Prior Publication Data

US 2023/0237229 A1 Jul. 27, 2023

Related U.S. Application Data

(60) Provisional application No. 63/039,042, filed on Jun. 15, 2020.

(30) Foreign Application Priority Data

Jun. 24, 2020 (NL) ...................................... 2025907

(51) Int. Cl.
*G06F 30/373* (2020.01)
*G06F 30/31* (2020.01)
(Continued)

(52) U.S. Cl.
CPC .......... *G06F 30/3312* (2020.01); *G06F 30/31* (2020.01); *G06F 30/337* (2020.01); *G06F 2119/06* (2020.01)

(58) Field of Classification Search
CPC .... G06F 30/3312; G06F 30/31; G06F 30/337; G06F 2119/06; G06F 30/373; G06F 30/367
See application file for complete search history.

(56) References Cited

U.S. PATENT DOCUMENTS

| | | | | |
|---|---|---|---|---|
| 12,177,349 B1 * | 12/2024 | Wen | .................... | G06N 3/048 |
| 2016/0140340 A1 * | 5/2016 | Walters | .............. | G06F 21/556 |
| | | | | 726/22 |

(Continued)

OTHER PUBLICATIONS

Slpsk Patanjali et al: "Karna: A Gate-Sizing based Security Aware EDA Flow for Improved Power Side-Channel Attack Protection", 2019 IEEE/ACM International Conference on Computer—AI OED Design (ICCAD). IEEE, Nov. 4, 2019 (Nov. 4, 2019), pp. 1-8, XP033678305.

(Continued)

*Primary Examiner* — Nghia M Doan

(57) ABSTRACT

A method of identifying, in a circuit design of an electronic circuit, a source of side channel leakage of the electronic circuit. The method comprises: a) simulating over a leakage time interval an operation of the circuit in response to at least one stimulus, thereby deriving for each one of the at least one stimulus per circuit part of the electronic circuit a respective simulated leakage quantity circuit part response over the leakage time interval; b) obtaining for each one of the at least one stimulus an expected leakage quantity response over the leakage time interval from a processing of each one of the at least one stimulus by a leakage model, the leakage model modelling a leak-quantity at a processing of a secure asset; c) determining respective circuit part corre- (Continued)

lations over the leakage time interval between the respective simulated leakage quantity circuit part responses and the expected leakage quantity responses; d) ranking the circuit parts based on the circuit part correlations between the respective simulated leakage quantity circuit part responses and the expected leakage quantity responses and e) identifying as the source of side channel leakage the circuit part for which a highest one of the circuit correlations has been determined between the expected leakage quantity responses and the respective simulated leakage quantity circuit part responses.

17 Claims, 8 Drawing Sheets

(51) Int. Cl.

| | | |
|---|---|---|
| *G06F 30/3312* | (2020.01) | |
| *G06F 30/337* | (2020.01) | |
| *G06F 30/367* | (2020.01) | |
| *G06F 119/06* | (2020.01) | |

(56) References Cited

U.S. PATENT DOCUMENTS

| | | | |
|---|---|---|---|
| 2020/0151305 A1* | 5/2020 | Lam | ........................... G06F 8/41 |
| 2021/0224452 A1* | 7/2021 | Lin | ......................... G06F 30/33 |

OTHER PUBLICATIONS

John Demme et al: Side-channel vulnerability factor: A metric for measuring information leakage:, Computer Architecture (ISCA), 2012 39th Annual International Symposium On, IEEE, Jun. 9, 2012 (Jun. 9, 2012), pp. 106-117, XP032200026.

He Miao Tony et al: "RTL-PSC: Automated Power Side-Channel Leakage Assessment at Register-Transfer Level", 2019 IEEE 37th VLSI Test Symposium (VTS), IEEE, Apr. 23, 2019 (Apr. 23, 2019), pp. 1-6, XP033575852.

Adib Nahiyan et al: 11 SCRIPT : A CAD Framework for Power Side-channel Vulnerability Assessment Using Information Flow Tracking and Pattern Generation, ACM Transactions on Design Automation of Electronic Systems., vol. 25, No. 3, May 14, 2020 (May 14, 2020) pp. 1-27.

* cited by examiner

RTL Design

Logic Synthesizer

Netlist

Stimuli (testbench) → Gate level Simulator (ModelSim) ← Std. Cell Library (.db)

Toggle Trace (VCD)

Power Simulator (PTPX)

Simulated Power Trace

SIDE CHANNEL LEAKAGE SOURCE IDENTIFICATION IN AN ELECTRONIC CIRCUIT DESIGN

The invention relates to a method of identifying a circuit design part of an electronic circuit design as a source of side channel leakage. Furthermore the invention relates to a method of designing an electronic circuit.

Side channel leakage may be understood as a leakage of information from an electronic data processing circuit. The leakage may be in the form of power consumption, emission of electromagnetic radiation, or other forms of side channel leakage, such as timing information (time a certain operation takes to execute), sound and photonic emissions.

The process of attempting to derive information from the electronic data processing circuit may be indicated by the term side channel analysis.

Side channel analysis, SCA, may be understood as an attack to derive information, such as the information of a cryptographic device. In principle any information on what is processed by the device is possible to retrieve in various levels. For instance, one can identify the precise timing of various parts of the code running on a device if some information on the underlying code is available to an attacker. In the case of a cryptographic device, the concept of 'information' in the context SCA generally refers to a secret key of a cryptographic algorithm. The hypothesis made in such an attack is that the physical outputs of a cryptographic device demonstrate a correlation with the internal state of the device when conducting cryptographic operations. Side channel analysis based on an analysis of power consumption may be identified as power analysis.

Power analysis attacks are carried out by monitoring the power consumption on a cryptographic device, for example by using an oscilloscope. In this type of attack, one must first assume that there is correlation between the level of power consumption and cryptographic operations performed by the device. Originally, there were two main categories of power analysis attacks including simple power analysis (SPA) and DPA.

In SPA, one monitors the power trace of a cryptographic device (as it performs a cryptographic function) and attempts to determine the secret key based on the measurement (e.g. voltage levels) produced. Modern implementations are typically SPA protected. Therefore, in practice, it can be rather difficult to deduce the values of a secret by SPA alone. However, although one may be unable to deduce the secret key using this technique, it does present the capability to identify the cryptographic algorithm and enable more powerful attacks which specifically exploit any weakness of an algorithm to take place.

An example of a more powerful attack is DPA. This attack makes use of statistical techniques to identify differences in power traces, thus revealing data leakage which may result in the correct secret key being guessed. A hypothesised power model may be applied.

In DPA, the goal is to accurately produce a power model of the device under attack. During an attack, the aim is to find correlation between a predicted output and the actual power output of a device. If the power model is accurate then a strong correlation should be demonstrated between the predicted output and actual output.

Electronic computers (microcontrollers, FPGAs, etc) have two components to their power consumption. First, static power consumption is the power required to keep the device running. This static power depends on for example the number of transistors inside the device. Secondly, dynamic power consumption depends on the data moving around inside the device. Every time a bit is changed from a 0 to a 1 (or vice versa), some current is required to (dis)charge the data lines. Both static and dynamic power may be used.

An example of a power model is the Hamming Weight Power Model. Traditionally, the Hamming weight of a value is the number of non-zeroes. For example, in the binary number 1100 0010 the Hamming weight would be 3. The assumption in using the Hamming Weight Power Model in power analysis attacks is that the number of bits set to 0 or 1 of an output is correlated with the power consumption of a device. The Hamming weight itself is then used as an arbitrary unit to model the consumption of power in a device. Hamming weight units can then be compared to the actual voltage levels of power traces captured when a device was performing cryptographic operations. This act of comparison is the process of finding correlation between the modelled power unit values and the actual power consumed.

Another model for power consumption is the Hamming Distance model. The Hamming Distance between two binary numbers is the number of different bits in the numbers. For example, $$HammingDistance(00110000,00100011)=3$$

as there are 3 unequal bits in these two numbers. An efficient way to calculate the Hamming Distance is $$HammingDistance(x,y)=HammingWeight(x\char`^y)$$

where $\char`^$ is the XOR operator, and the Hamming Weight is the number of 1s in a binary number. Using the example above, $$HammingDistance(00110000, 00100011) = HammingWeight(00010011)$$

$$= 3$$

as 00010011 has three bits set.

If a point in the encryption algorithm can be found where the victim changes a variable from x to y, then one can estimate that the power consumption is proportional to Hamming Distance(x, y).

One technique to calculate correlation between the power model and the actual power consumption is to use Pearson correlation coefficient equation. In essence, this equation will take two sets data (W and P) and calculate whether there is a linear (positive or negative) correlation between the two sets of values. This equation may be used to find significance in the present power traces since the assumption with the Hamming Weight Power Model is that as the number of 1's increase in the present predicted output, so too does the power consumption increase in the actual output (and vice versa).

For example, the Hamming weight for output 0000 0111 would be 3 while 0000 1111 would be 4 and so on.

Thus, side channel leakage as described above can be exploited to retrieve data, such as a secret key, from analysis of a power consumption trace.

A problem associated with the above methods of side channel analysis is that they do not enable to locate a source of side channel leakage accurately.

The invention aims to provide a method of identifying a source of side channel leakage in an electronic circuit design.

In order to achieve this aim, according to an aspect of the invention, there is provided a method of identifying, in a circuit design of an electronic circuit, a source of side channel leakage of the electronic circuit, the method comprising:

a) simulating over a leakage time interval an operation of the circuit in response to at least one stimulus, thereby deriving for each one of the at least one stimulus per circuit part of the electronic circuit a respective simulated leakage quantity circuit part response over the leakage time interval, the respective simulated leakage quantity circuit part response expressing a leakage quantity of the circuit part responsive to the respective stimulus;

b) obtaining for each one of the at least one stimulus an expected leakage quantity response over the leakage time interval from a processing of each one of the at least one stimulus by a leakage model, the leakage model modelling the leakage quantity at a processing of a secure asset;

c) determining, per circuit part, a respective circuit part correlation over the leakage time interval between the respective simulated leakage quantity circuit part response to each one of the at least one stimulus, and the expected leakage quantity response to each one of the at least one stimulus;

d) ranking the circuit parts based on the circuit part correlations between the respective simulated leakage quantity circuit part responses and the expected leakage quantity responses and e) identifying as the source of side channel leakage the circuit part for which a highest one of the circuit part correlations has been determined between the expected leakage quantity responses and the respective simulated leakage quantity circuit part responses.

The electronic circuit may be a data processing circuit, such as a data processing integrated circuit or a data processing printed circuit board e.g. comprising at least one data processing integrated circuit. The data processing circuit may e.g. comprise a microprocessor, an encryption processor or encryption co-processor, such as an Advanced Encryption Standard, AES, processor or co-processor, a DES co-processor, a public key cryptographic co-processor or any other secure elements.

The electronic circuit design may be defined as a hierarchical netlist of electronic components. A hierarchical netlist is a netlist where each individual component can be a primitive element or a hierarchical netlist in itself. The electronic components can be expressed at several abstraction levels, such as register-transfer level, gate-level or transistor-level.

Within the context of the present invention, the term side channel leakage may be understood as a leakage of information from an electronic circuit, e.g. via the power supply. The leakage may be power consumption of the electronic circuit. Furthermore, the leakage may be electromagnetic radiation emitted by the electronic circuit or any other suitable quantity. The term "leakage quantity" may thus be understood as any quantity via which information may leak from the electronic circuit, e.g. the power consumption (e.g. the power supply current), emitted electromagnetic radiation, etc. The side channel leakage may provide information enabling to assist in retrieving a secure asset. The secure asset may for example comprise a key employed in encryption or decryption, or data that is communicated by the circuit, such as data transmitted over a data communication bus. The leakage of the information may for example be obtained from a time trace of the leakage quantity.

The electronic circuit comprises plural circuit parts. The parts of the electronic circuit may be understood as functional blocks of the circuit, gates, sub-circuits, etc. The parts of the electronic circuit may be at any desired level in a hierarchical netlist.

The method may provide for an identification of a source of side channel leakage, the source of side channel leakage e.g. being a circuit part providing a relatively high contribution to the side channel leakage. The method may be performed at a design stage of the electronic circuit.

Thus, e.g. prior to manufacturing of the electronic circuit, the method may be performed when a design of the electronic circuit has been generated.

The response of each circuit part may comprise a time trace of activities performed by the electronic circuit (or parts thereof), the activities may comprise gate switching actions, e.g. a sequence of logic states thereby allowing a detailed determination of the correlation with the response of the power leakage model or other leakage model, as a sequence of states may be taken into account. Alternatively, the circuit part responses may comprise logic states at the end of the power leakage time interval, hence allowing a faster, less complex determination of the correlations with the response of the leakage model. The responses of the circuit parts and of the leakage model may comprise any suitable quantity, such as toggle traces, logic states, power consumption traces, etc., which may be indicative of actions resulting in leakage. For example, each toggle action may translate into leakage, e.g. in a form of power supply current spikes.

The at least one stimulus may be any suitable input, e.g. an electrical input, preferably a digital input such as one or more data bytes. The stimuli are provided to the circuit parts as well as to the leakage model, thereby enabling to seek for a correlation between the response of the leakage model and the response of each one of the circuit parts. A constraint for the stimulus may be that it should enable an efficient analysis once the simulations are generated.

Therefore, the actual stimulus may depend on the type of analysis method chosen. In case of correlation analysis, the stimulus may be uniformly random for instance. The stimulus may be applied to the whole circuit. As a result, the entire design may be simulated to get an accurate picture of the leakage quantity, e.g. the power consumption. However, depending on the level of granularity required and computation resources, one may choose to apply the stimulus on only a part of the circuit design as well. The input data for a cryptographic algorithm may be a stimulus for instance. In case the leakage of a microcontroller processing unit is to be investigated, the stimulus may also be a piece of code to be run by the processing unit.

Depending on the component that is tested, an appropriate stimulus may be selected.

The method may comprise the following steps:

a) simulating an operation of the circuit in response to at least one stimulus, thereby deriving for each one of the at least one stimulus per circuit part of the electronic circuit a respective simulated leakage quantity circuit part response over the leakage time interval. The at least one stimulus may initiate a processing associated with data that is to be kept secret, such as the processing of a secret key, e.g. an encryption performed using an encryption key. The simulation of the electronic circuit design may e.g. be a logic level simulation or gate level simulation. The simulation is performed over a leakage time interval, being a time interval within which the potential side channel leakage may take place. The simulation provides per circuit design part a respective simulated leakage quantity circuit part response over the leakage time interval, the simulated leakage quantity circuit part response may express a contribution of the circuit part to the leakage quantity. For example, in case the leakage quantity is power consumption, the power supply current of the circuit part may form the leakage quantity circuit part response. The leakage time interval may be any suitable simulation time interval within which the stimulus is provided, in the simulation, to the circuit.

b) obtaining for each one of the at least one stimulus an expected leakage quantity response over the leakage time interval from a processing of each one of the at least one stimulus by a leakage model, the leakage model modelling a leakage quantity at a processing of a secure asset. A leakage model is provided. The leakage model models a processing of a secure asset. The leakage model may output a sequence of logic states when processing the secure asset or may output a logic state, e.g. at an end of the leakage time interval. For example, in case the electronic circuit comprises an encryption circuit (e.g. an encryption co-processor) the model may output a sequence of logic states as occurring during the process of encryption using a known encryption key. Using the leakage model, an expected logic response of a processing of the secure asset is provided.

c) determining, per circuit part, a respective circuit part correlation over the leakage time interval between the respective simulated leakage quantity circuit part response to each one of the at least one stimulus, and the expected leakage quantity response to each one of the at least one stimulus.

Circuit part correlations, i.e. correlations per circuit part, over the leakage time interval are determined between the respective simulated circuit part response of the respective circuit part and the expected response by the circuit part as obtained from the leakage model; The higher a correlation between the simulated response of a respective circuit part and the expected response, the more likely that the respective circuit part is to contribute to side channel leakage. When making use of plural stimuli, for each circuit part, the correlations for a circuit part may be determined per stimulus, and then combined to form an (aggregate) correlation per circuit part over the plural stimuli. When making use of a single stimulus, the correlation between the simulated response and the expected response may be derived from e.g. the waveforms of the simulated and expected responses, the frequency content of both responses, etc., thereby e.g. taking characteristics of an analogue waveform of the response (e.g. amplitude, rise time, harmonic frequency content, etc.) into account. Furthermore, the length of the single stimulus (e.g. a number of bits of a single stimulus) may be relatively long as compared to using plural stimuli, which may serve to perform an accurate correlation, e.g. perform a correlation using a bit sequence and/or perform a correlation using e.g. an analogue waveform of the simulated and expected response, or any suitable correlation of simulation outputs.

d) ranking the circuit parts based on the circuit part correlations between the respective simulated leakage quantity circuit part responses and the expected leakage quantity responses. The circuit parts are ranked based on the circuit part correlations between the respective simulated response of the respective circuit part and the expected response. The ranking may be performed in ascending order or descending order of correlation. Pearson's correlation coefficient may be applied. As a further example, one may apply a dot product on vectors on a projection of the actual simulation data in which 0's are replaced with −1 and 1's stay the same. Other correlation functions may be applied.

e) identifying as the source of side channel leakage the circuit part for which a highest one of the circuit part correlations has been determined between the expected leakage quantity responses and the respective simulated leakage quantity circuit part responses.

The circuit design part for which a highest correlation is found between the expected response and the respective simulated response of the circuit part may be identified as the (likely) source of side channel leakage.

Thus, the leakage model that models an expected processing of a (known) secure asset is applied by comparing a response of the power leakage model to responses of the circuit parts, whereby the leakage model and the circuit parts are subject to the same at least one stimulus. The response of the leakage model and the responses of the circuit parts are determined over a leakage time interval, being an interval within which side channel leakage may be imminent. The circuit part or circuit parts that exhibit(s) a high correlation with the response of the leakage model, may be identified as a circuit part prone to side channel leakage.

In an embodiment, each circuit part is a respective gate of the electronic circuit, wherein the simulated leakage quantity circuit part responses comprise simulated logic states of the respective gate for each one of the at least one stimulus, wherein the expected leakage quantity responses comprise expected logic states of the leakage model for each one of the at least one stimulus, wherein the circuit part correlation is determined per gate from a correlation between the simulated logic states of the respective gate for each one of the at least one stimulus and the expected logic states of the leakage model for each one of the at least one stimulus.

As each circuit part of the electronic circuit is a gate of the electronic circuit, in a) a response to the at least one stimulus may be obtained per gate. The responses per gate to the at least one stimulus may comprise logic states of the respective gate in response to the at least one stimulus. The simulated logic states responsive to each one of the at least one stimulus may be determined for plural one of the gates of the electronic circuit, e.g. for each one of the gates of the electronic circuit. The expected leakage quantity responses as obtained by providing the stimuli to the leakage model may comprise logic states of the leakage model in response to each one of the at least one stimuli. A correlation may be determined per gate between the simulated logic states of the respective gate for each one of the at least one stimulus and the expected logic states of the leakage model for each one of the at least one stimulus. The correlation may be determined for each one of the gates of the electronic circuit. Ranking the gates according to the correlation may identify the gates for which the correlation is highest or for which the correlation exceeds a correlation threshold. This gate respectively these gates may be identified as source(s) of side channel leakage. Accordingly, a source of side channel leakage may be identified at a gate level, i.e. individual gates which appear to contribute to side channel leakage may be identified. As the correlations between the logic states of the gates and the logic states of the leakage model, for each one of the at least one stimuli, are determined, an assessment may be performed based on logic level input (e.g. logic states, toggle traces, etc.), i.e. without requiring to take account of layout data representing a layout of the electronic circuit. Thus, a post-layout netlist does not necessarily need to be taken into account. The side channel analysis may be performed without making use of layout of the electronic circuit, e.g. at a pre-layout stage of a design process of the electronic circuit. A behavioural model netlist of the electronic circuit may be used. Moreover, as the logic states may be determined for each gate, the responses per gate, i.e. the logic states per gate, may be used as input, enabling to assess sources of side channel leakage at a gate level.

In an embodiment, the method further comprises determining the leakage time interval by:

simulating the operation of the electronic circuit to obtain a simulated circuit activity trace of the electronic circuit;

determining an expected logic sequence from the power leakage model;

correlating over plural different time intervals the simulated circuit activity trace of the electronic circuit design to the expected logic sequence;

determining the leakage time interval using the time interval of the plural different time intervals exhibiting a highest correlation between the simulated circuit activity trace of the electronic circuit design and the expected logic sequence.

The simulated circuit activity trace of the electronic circuit provides a simulated activity trace of the electronic circuit as a whole, i.e. the simulated activity trace of the ensemble of the electronic circuit parts. For example, summed activity traces of the circuit parts may be applied. The simulated activity trace of the electronic circuit may be formed by a simulated power supply current trace or a simulated gate activity toggle trace of the logic gates of the electronic circuit. By searching for the time interval in which a highest correlation is found, the steps a)-e) as described above may specifically be performed within this time interval. Thus, the relatively more highly computational analysis per circuit part may be performed over this time interval. As a result, on the one hand, relatively more highly computational analysis may be performed over a most relevant time interval only thus reducing an overall time required to perform the steps of the method. Moreover, as the steps a)-e) are performed specifically in the time interval during which side channel leakage appears to highest, a meaningful correlation between the responses of the circuit parts and the response of the power leakage model may be performed, thus resulting in a more accurate identification of the circuit part prone to side channel leakage. Hence, the source of side channel leakage may be located more accurately.

The simulated leakage quantity circuit part responses of the circuit parts may be provided e.g. in the form of power supply current (time) traces and/or in the form of a toggle traces. Using toggle traces, a relatively low computation correlation calculation may be performed, as toggle actions are binary events. Using simulated power supply current time traces, different effects of switching of gates of the circuit on the power supply current time trace may be taken into account, such as effects due to differences in gate transistor size, differences in power supply bouncing of gate lines or bouncing of ground lines as a result of switching of gates, differences in power supply decoupling, effects of clock skew on a timing of switching actions, etc., enabling to perform a more accurate simulation of the effects of a switching of the gates on the power supply current, this enabling to perform a more accurate simulation of side channel leakage.

The process as performed by the steps a)-e) may in the present document be referred to as Gate Level Analysis, also abbreviated as GLA In an embodiment, the simulated activity traces of the circuit design parts comprise simulated toggle traces. In order to more accurately take account of an effect of the switching of the gate on power consumption, in c) the simulated toggle traces may each be multiplied by a weight factor, the weight factor representing a power consumption of a logic gate of the respective circuit part.

In an embodiment, at least two stimuli are provided to each circuit part as well as to the leakage model, and wherein the determining the correlation in c) comprises counting per circuit part a number of stimuli for which the simulated leakage quantity circuit part response corresponds to the expected leakage quantity response to the one of the stimuli. The correlation can hence be determined relatively easily, even for a large number of circuit parts in the simulation, by establishing for each stimulus if the simulated response equals the expected response, and counting per circuit part the number of stimuli for which the simulated response equals the expected response. The higher the number of (different) stimuli for which the expected response from the leakage model corresponds to the simulated response by the circuit part, the higher a correlation between the response by the circuit part and the response by the leakage model.

In an embodiment, wherein at least two random stimuli are provided to each circuit part, i.e. the at least one stimulus comprise at least two random stimuli, the leakage quantity circuit part response comprises responses to each one of the at least two random stimuli and the expected leakage quantity response by the power leakage model comprises expected leakage quantity responses to each one of the at least two random stimuli.

When applying a plurality of stimuli, an accurate correlation between the response of the circuit parts and the response of the leakage model may be determined, as a high correlation at a variety of stimuli may indicate a high likelihood of a response similar to the power leakage model. The plurality of stimuli may be a plurality of random stimuli, hence being able to take various responses into account, using stimuli that are unbiased by a selection of a design engineer. Random stimuli may be a pre-condition to be able to use Pearson's correlation coefficient for analysis. The correlations may e.g. be determined using the above described counting of equal responses by the circuit part and by the leakage model.

In an embodiment, the at least one stimulus comprise a first stimulus and a second stimulus, the method comprising deriving plural leakage quantity circuit part responses per stimulus, determining a statistical difference between the leakage quantity circuit part responses obtained with the first stimulus and the leakage quantity circuit part responses obtained with the second stimulus and establishing if the statistical difference exceeds a predetermined threshold. Two stimuli may be used for high level leakage assessment. Plural measurements are collected with two selected stimuli and then the measurements are grouped into two groups based on the stimulus used. Then looking at the statistical differences between these two groups, it is determined whether the two sets are different in a statistically significant way. If there is such a difference between the collected measurement groups, i.e. if the statistical difference exceeds the predetermined threshold, this may indicate that there is side channel leakage in the measurements related to the chosen stimuli. The result of the analysis would lead to an output similar to correlation (test statistic value per analyzed time sample).

In an embodiment, wherein an aggregated stimulus is provided comprising at least two stimuli, and wherein in the simulation in a) the at least two stimuli comprised in the aggregated stimulus are each provided to one of the circuit parts, thereby deriving for each one of the at least two stimuli comprised in the aggregated stimulus, a respective simulated leakage quantity circuit part response from the one of the circuit parts of the electronic circuit. Hence, a single large stimulus may be processed by a part of the circuit, for example for each of its bits, each bit forming a stimulus of the aggregated stimulus. Furthermore, for example in cryptography, plural identical circuit parts may each process a part of data in the cryptographic process. The inventors have realized that these identical circuit parts may exhibit similar leakage properties, and that the analysis as described in the present document may hence be performed relatively effectively by using the responses from the identical circuit parts to the different parts of the aggregate stimulus, i.e. by using the parts of the aggregate stimulus as different stimuli. The stimuli comprised in the aggregate stimulus may e.g. each be formed by a bit or a group of bits. Thus, by providing an aggregate stimulus which is divided in plural parts, each part in fact forming a stimulus, the circuit part may be provided with each one of the stimuli, e.g. sequentially, thereby being able to derive multiple data points for analysis from a single stimulus, hence allowing an effective analysis of leakage in the circuit part, by dividing the (aggregate) stimulus in parts and subjecting in the simulation, the circuit part to different parts of the stimulus. An example can be digital signature generation for public key cryptography implementations. Since such implementations usually utilize the same part of an electronic circuit design over parts of the stimulus, it may be possible to perform analysis based on a single stimulus and selecting a larger leakage time interval for analysis. The correlations per circuit part, as determined in c), may be determined for the plural identical circuit parts using the responses of the identical circuit parts to the different parts of the aggregate stimulus.

As explained above, the leakage quantity may comprise at least one of power consumption and electromagnetic radiation.

In an embodiment, the simulated leakage quantity circuit part responses comprises simulated circuit part logic states for each one of the at least one stimulus, the expected leakage quantity responses comprising expected logic states for each one of the at least one stimulus, and wherein the respective circuit part correlations are determined as a sum of correlations between the respective simulated circuit part logic state and the respective expected logic states, for each one of the at least one stimulus.

Thereby, the resulting correlations as obtained for plural stimuli may be added, hence being able to rate the correlations in a meaningful and fast way.

In order to take account of differences in an impact of a switching of the circuit parts on power consumption, in c) the circuit part correlations may each multiplied by a respective weight factor, the respective weight factor representing a power consumption of a logic gate or a driver of the respective circuit part. The weight factor may take account of capacitive load (e.g. output line length), power line length and decoupling, gate size, and other factors.

In an embodiment, the power leakage model is configured to output a sequence of subsequent logic states responsive to the respective stimulus. When attempting to derive information from an electronic circuit by means of side channel analysis, specific data is sought, such as an encryption key or any other data that is intended to be kept confidential. The power leakage model may specifically model a sequence of logic states associated with a processing of the secure asset, e.g. secret data as may be sought. For example, in the case of an encryption key, the power leakage model may model the consecutive logic actions to be taken when performing an encryption using the encryption key. Other examples of processes that may be modelled may include a behavior of an integrated circuit when secret data is transmitted on a data bus to e.g. a security co-processor.

The sequence of logic states may be formed by a sequence of binary states.

For example, the secure asset may be a predetermined encryption key or a predetermined decryption key, the power leakage model being configured to model the processing of the predetermined encryption key or predetermined decryption key. Alternatively, the secure asset may be data communicated by the electronic circuit.

In an embodiment, the method comprises determining, using the power leakage model, a Hamming distance between the subsequent logic states. Taking the Hamming distance between subsequent logic states, a representation of the numbers of gates switching values may be obtained per subsequent logic states, which number of switching gates may reflect into side channel leakage.

The secure asset may be data transmitted by the electronic circuit, the leakage model being configured to model a transmission of the data by the electronic circuit.

In an embodiment, the method comprises determining, using the power leakage model, a Hamming weight of the subsequent logic states. Using Hamming weight may provide a suitable modelling in cases where the circuit (e.g. a communication bus implementing a communication protocol) is biased towards a specific logic state. Hence, the Hamming weight may provide a measure of the logic "distance" from such bias state. Thus, the Hamming weight may for example be applied in case the leakage model models a transmission of data by the electronic circuit.

In an embodiment, the circuit parts are one of registers, logic gates and transistors. Thus, sources of side channel leakage may be identified at the level of a register, a logic gate or a transistor. The method may be performed, during a process of designing the electronic circuit, at different levels. For example, the method may be performed at a register level to identify a register where side channel leakage may occur, following which an analysis at gate or transistor level may be performed in order to assess the register and to verify an effect of design amendments.

According to a further aspect of the present invention, there is provided a method of reducing at a design stage a susceptibility to side channel leakage of an electronic circuit, comprising:

i) providing an electronic circuit design of an electronic circuit comprising plural circuit parts;

ii) detecting a source of side channel leakage of the electronic circuit according to the method of any of the preceding claims; and iii) amending the design of the electronic circuit by reducing a susceptibility to side channel leakage of the circuit part identified as the source of the side channel leakage.

Hence, the design of the electronic circuit may be enhanced so as to reduce a susceptibility of side channel leakage, already at the design stage of the electronic circuit.

The process may be iterated, repeating ii) and iii) on the basis of the amended electronic circuit design to address e.g. various potential circuit parts that may be susceptible to side channel leakage. The sources of side channel leakage may be addressed by any suitable measure, e.g. adding in-circuit power supply filtering, adding circuitry which performs logic state transitions complementary to the logic state transitions performed by the part that exhibits side channel leakage, so as to compensate a power draw from the switching actions of the leaking circuit by complementary switching actions, etc.

Further features advantages and effects of the invention will be explained based on the appended drawing, illustrating a non-limiting embodiment of the invention, wherein:

FIG. 1 depicts a flow diagram based on which a method of locating a vulnerability to side channel leakage is described.

Figure 1:
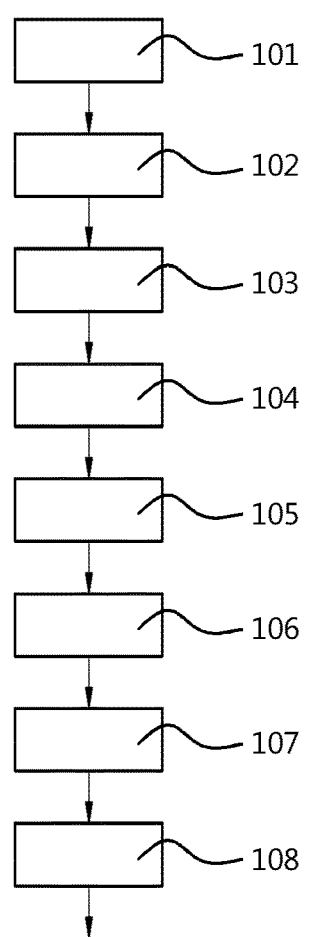
FIG. 1 depicts a flow diagram illustrating a method according an embodiment of the invention.
Figure 2:
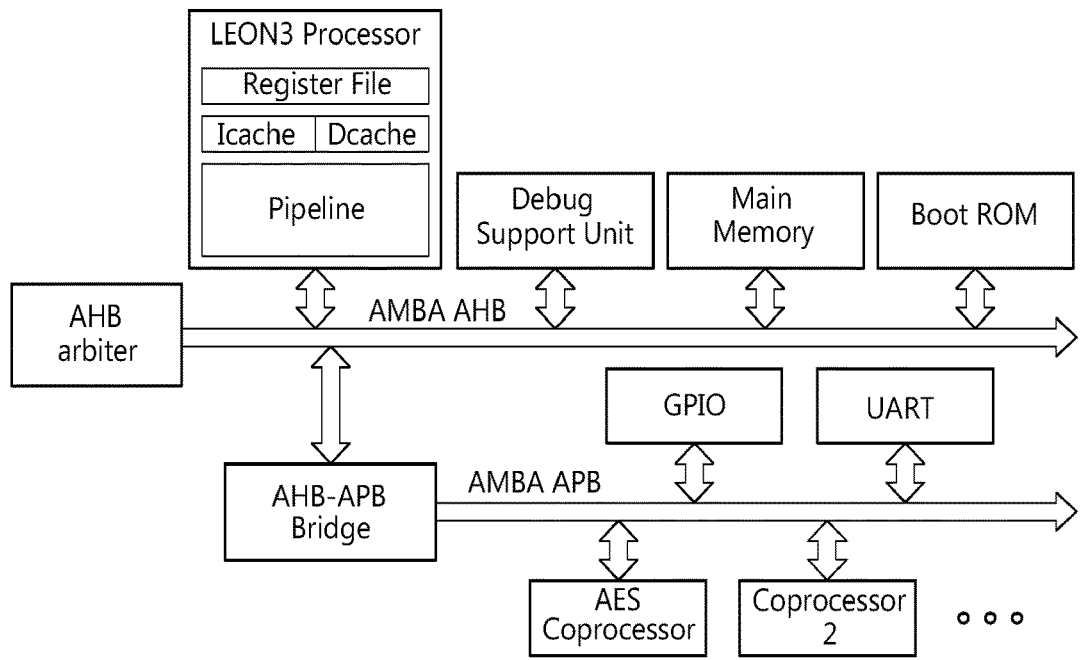
FIG. 2 depicts a block diagram of an electronic circuit according to a first example.
Figure 3:
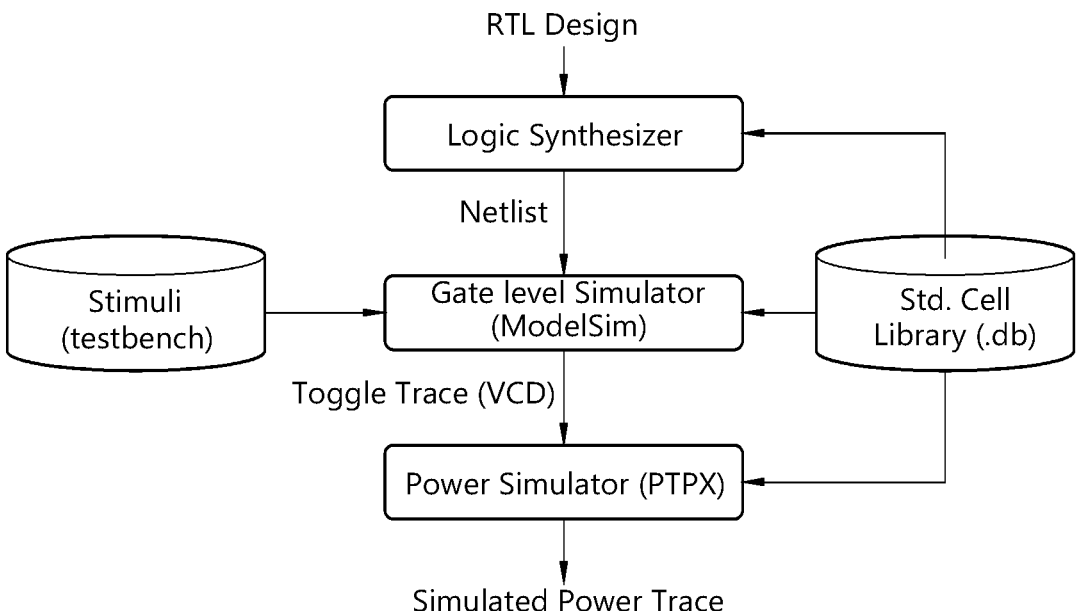
FIG. 3 depicts a flow diagram illustrating a simulation procedure according to the first example.

Side-channel analysis techniques, including differential power analysis (DPA) and correlation power analysis, rely on a leakage model to drive the estimation of the secret intermediate variable. As an alternative to power leakage as the leakage quantity, electromagnetic radiation leaking from the electronic circuit may be used as the leakage quantity. A leakage model, also referred to as power leakage model or leakage function, is a model of the side-channel leakage occurring in a design. In the conventional side channel analysis, the power leakage model as applied is a measure for the information leakage incurred through power consumption variations. The power leakage model L is a function which models the power dissipation over a secret intermediate variable V or an intermediate variable which has a direct dependency on an internal secret. Through many observations of the measured power consumption and correlation with L(V), the value of V is eventually revealed. Popular choices for L(V) are the Hamming Weight or the Hamming Distance of the intermediate variable V; These values are commensurate with the power because they are related to the number of logic transitions proportional to the secret intermediate variable. Hamming Weight reflects value based power leakage in CMOS, while Hamming Distance reflects distance-based power leakage in CMOS. The notation Lj(V) is used to indicate a leakage model for bit j from the secret intermediate variable V.

The objective of the present development is to identify, within gate-level netlist, the gates (or more generally: circuit parts) that contribute to side channel leakage. Thereto, the objective is to identify the gates that realize L(V). Naturally there are many possible choices for the leakage function. A leakage function L(V) is chosen. The leakage function is chosen in accordance with an algorithm as executed by the electronic circuit. For example, in the case of an AES encryption, a leakage model may be selected for AES hardware implementations and a leakage model may be selected for AES software implementations. In an AES hardware implementation, the Hamming Distance between the AES state of subsequent rounds may be a typical choice. In an AES software implementation, where leakage can occur through reuse of processor registers, the Hamming Distance between the AES state and any intermediate result of the AES round may be a candidate leakage model.

However, the value V does not have to be related to a cryptographic key, and any sensitive value processed in a design could be analyzed. For example, the presently described method may be used to study bus transfer operations in an SoC. In that case, the value V may be a sensitive value transferred over the bus, and L(V) may be the Hamming weight of the value. The Hamming weight reflects the pre-charged nature of a shared bus.

Generally, when a leakage model is used to correlate a measurement with an estimation, it may lead to a successful side-channel analysis which uncovers the secret intermediate variable. In GLA, the leakage model also serves the purpose of analysing the architecture. Indeed, at design time the designer knows everything about the design, including the secret variables. Hence, the designer can use gate-level simulation to identify what net activities (i.e. responses) in a design are correlated with the leakage model response. The designer can predict what nets will contribute to power dissipation variations that lead to a successful side-channel attack. The first objective of GLA is to identify the cells that are correlated with the leakage model. Indirectly, this answers the question of what gates of a design contribute to side-channel leakage. Moreover, not all nets contribute the same amount of power dissipation. Because of variations in gate sizing, fan-out and wire load, some nets have much more side-channel leakage than others. The second objective of GLA therefore is to rank all gates proportional to the amount of side-channel leakage they generate. The Leakage Impact Factor (LIF), a metric formally defined below, is defined to express the side-channel leakage per gate.

A purpose of Gate Level Analysis is to define a Leakage Impact Factor (LIF) for every gate in an electronic circuit design. The input of Gate Level Analysis may comprise a netlist to be analyzed, a secure asset V, a leakage model L(V) being a leakage model as a function of the secure asset, and a set of stimuli that exercise the netlist and the secure asset.

GLA includes three steps. In the frost step, the correlation between the leakage model and simulated power traces is looked for. In the second step, the correlation between the leakage model Lj and the gate switching activities is looked for. In the final step, the Leakage Impact Factor for each gate is computed, using the correlation factors and the power traces computed in the first two steps. The output of GLA is a ranked list of leaky gates in the design Reverting to FIG. 1, a leakage time interval us determined in steps 101-103.

By determining the leakage time interval, the analysis time window over which the Leakage Impact Factors are computed may be narrowed down. Generally, performing a detailed power simulation at the granularity of a gate over a long time window may be expensive from the computational as well as the storage point of view. Therefore the search window is narrowed to the Leakage Time Window using power correlation. Simulated system level power traces are determined in step 101, traces from the leakage model L(V) are determined in 102, and the simulated system level power traces are correlated with the traces from the leakage model L(V) in step 103. The correlation p is computed in accordance with formula (1) as $$\rho L(V); t = \frac{\text{cov}(L(V); P(t))}{\sigma L(V)\sigma P} \tag{1}$$

where:

cov=the covariance

σL(V)=the standard deviation of L(V)

σP=the standard deviation of P

The Leakage Time Interval is define as the time window (s) for which $$\rho L(V); t > \rho \text{threshold} \tag{2}$$

The threshold level ρthreshold may be to result in a distinguishable correlation peak. However, the Pearson Correlation Confidence Interval may be used to define reasonable bounds for ρthreshold as a function of the number of traces. A reasonable bound is one for which ρL(V); t is significantly different from zero with high confidence (99: 9%)

Comparing the present correlation calculation to the conventional side channel analysis calculations, the present correlation operation is typically easier and faster than a side-channel attack calculation for two reasons. First, the present simulation is run with full knowledge of the secure asset, therefore collecting only a single power trace P (t) for the complete system is required. Second, the simulation is noiseless and therefore a high correlation with the leakage model L(V) is provided.

As a result, sharp correlation peaks van be found with a very limited number of traces.

As a next phase, in the leakage time interval, one or more circuit parts that contribute to side channel leakage are identified.

In step 104, a toggle trace is obtained from a gate-level simulation of the electronic circuit design. A toggle trace Ki records the activity of each net i using the discrete values −1 and +1. For each time stamp tin the simulation, a toggle trace for net i has the value −1 if the net does not change value, and it has the value +1 if the net does change the value. In step 105, a toggle trace is obtained which represents the toggle activities Hof the leakage model L(V). Next, in step 106, Architecture Correlation is performed. For each net (or gate driver), the dot product of the toggle trace of the leakage model H with the toggle trace of net I is computed n accordance with formula (3):

$$Ci = Ki \cdot H \tag{3}$$

It is remarked that a high value in the correlation Ci as expressed in formula (3) has a different meaning compared to a high value in rho as expressed in formula (1). A high value in rho reflects a strong dependency between the overall power dissipation and the leakage model. Therefore, a high rho indicates side-channel leakage. On the other hand, a high value in Ci reflects a strong dependency between activity of net i and the leakage model. A high architecture correlation therefore means that the assumed leakage model is realized by one (or more) specific net(s).

TABLE I

| Example of Architecture Correlation | | | | | |
|---|---|---|---|---|---|
| Stimuli | S0 | S1 | S2 | S3 | Cij |
| Leakage Model Toggle Activity (Hj) | 1 | −1 | −1 | 1 | |
| net0 (K0) | 1 | −1 | −1 | 1 | 4 |
| net1 (K1) | 1 | 1 | 1 | 1 | 0 |
| net2 (K2) | −1 | 1 | −1 | −1 | −2 |

Table I illustrates a meaning of the architecture correlation factor Ci. The second row records the toggle activities of the leakage model for different stimuli S1, S2, S3 and S4. The leakage model value toggles for the first stimulus 50, it does not toggle for stimuli S1 and S2, and toggles for stimulus S3. At the same time, net0 also only toggles on stimuli S0 and S3 which matches the leakage model in all the four stimuli, therefore, the net0's correlation score is 4. On the other hand, net1 and net2 have a weaker correlations as 0 and −2 respectively. Overall, ranking the correlations, as indicated by step 107, a more positive and larger correlation indicates that a net approximates the leakage model more closely.

In a preferred step of Gate Level Analysis, the Leakage Impact Factor Fi of the driver of each net i, is computed as the Architecture Correlation of net i, weighted with the average power consumption Pi of the driver of net i, during the leakage time interval averaged over all stimuli.

$$Fi = CiPi \tag{4}$$

Thus, in step 107, the LIF Fi of all gates (hence, the correlations, optionally weighted with the average power consumption of the driver of the respective net) are ranked from highest to lowest. In step 108, the net drivers that rank highest in the list are marked as gates with side-channel leakage under leakage model L Various examples in which the above analysis technique is applied, are provided below.

In a first example, exploring the leakage sources inside the AES coprocessor is aimed at, while performing ten rounds of AES on a 128-bit plaintext using a 128-bit key.

GLA procedure The update of the state register of AES as a potential source of side-channel vulnerability is analysed. The secure asset for GLA is the intermediate value of the state register after the first round of AES. The leakage model for GLA target is the Hamming distance of the state register outputs of adjacent AES rounds (the first AddRoundKey and second AddRoundKey operation). This leakage model is known to reveal side channel leakage during the update of the state register. GLA then performs Power Correlation of the simulated power trace and the leakage model for all the 128-bits of the secure asset. The secure asset's most significant bit is represented as bit-0, and the least significant bit as bit-127. After analyzing the correlation results, it is observed that the seventh bit in each byte has the highest correlation value as compared to the rest of the bits suggesting that the seventh bit is the leakiest bit corresponding to the secure asset chosen. Therefore, the bit-6 (the seventh bit in the most significant byte) is chosen as the GLA analysis target.

Figure 4:
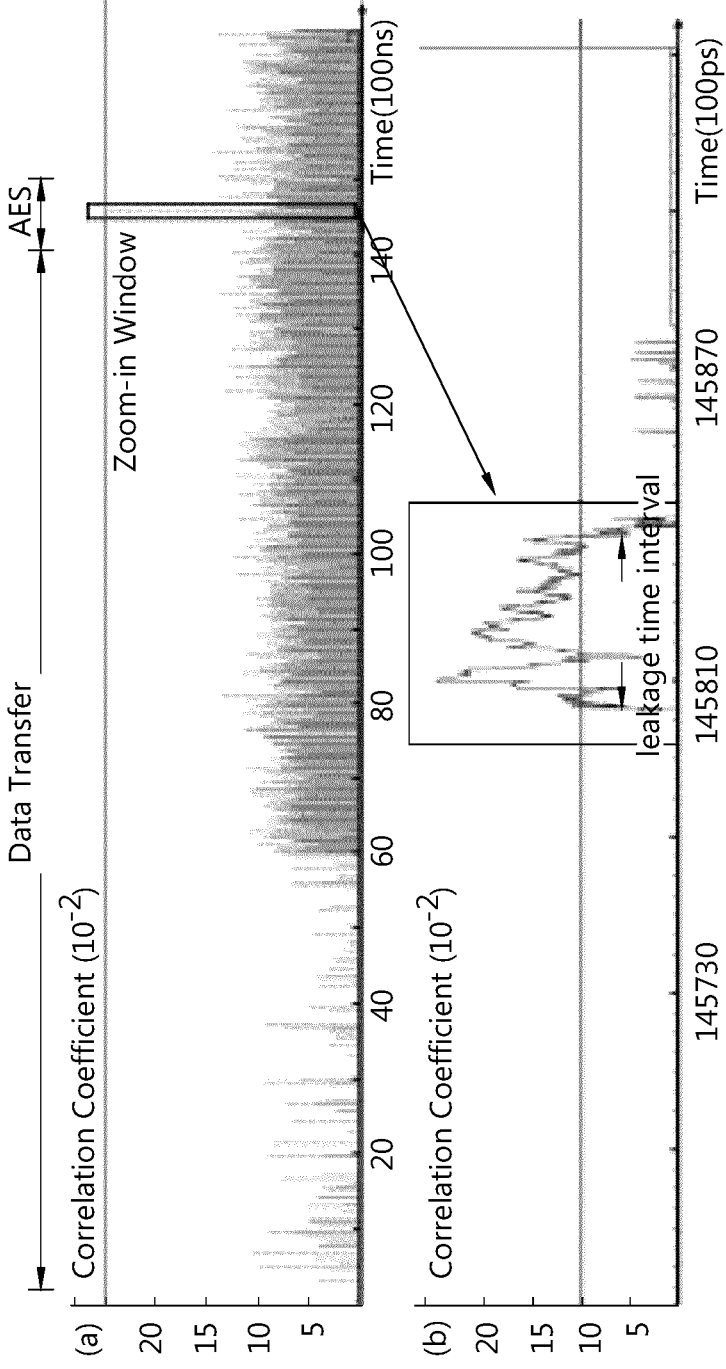
FIG. 4 depicts a correlation diagram illustrating an example of power correlation results relating to the electronic circuit according to the first example.

Before Architectural Correlation can be perform, one may identify a leakage time interval i.e. the intervals of side channel leakage identified by Power Correlation. For identification of this leakage time interval, a correlation threshold needs to be set. The threshold is selected as the 99% confidence interval boundary for the bivariate correlation coefficient (Pearson Correlation coefficient) value with a sample size of the number of simulated traces. For 600 traces, the resulting confidence interval is [−0.105, 0.105]. This suggests that a correlation coefficient value greater than 0.105 or lower than −0.105 is considered significantly different from zero with a 99% probability. The resultant leakage time interval using this threshold is shown in FIG. 4. The leakage time interval is used for performing Architecture Correlation. Architecture Correlation connects the activity of nets in the netlist with the leakage model during the leakage time interval which yields a list of nets which are consistent with the leakage model. The Leakage Impact Factor (LIF) is computed for the drivers of these nets resulting in a list of cells in the descending order of their Leakage Impact Factor (LIF) value, which signifies the individual contribution of these cells to side channel leakage.

Figure 5:
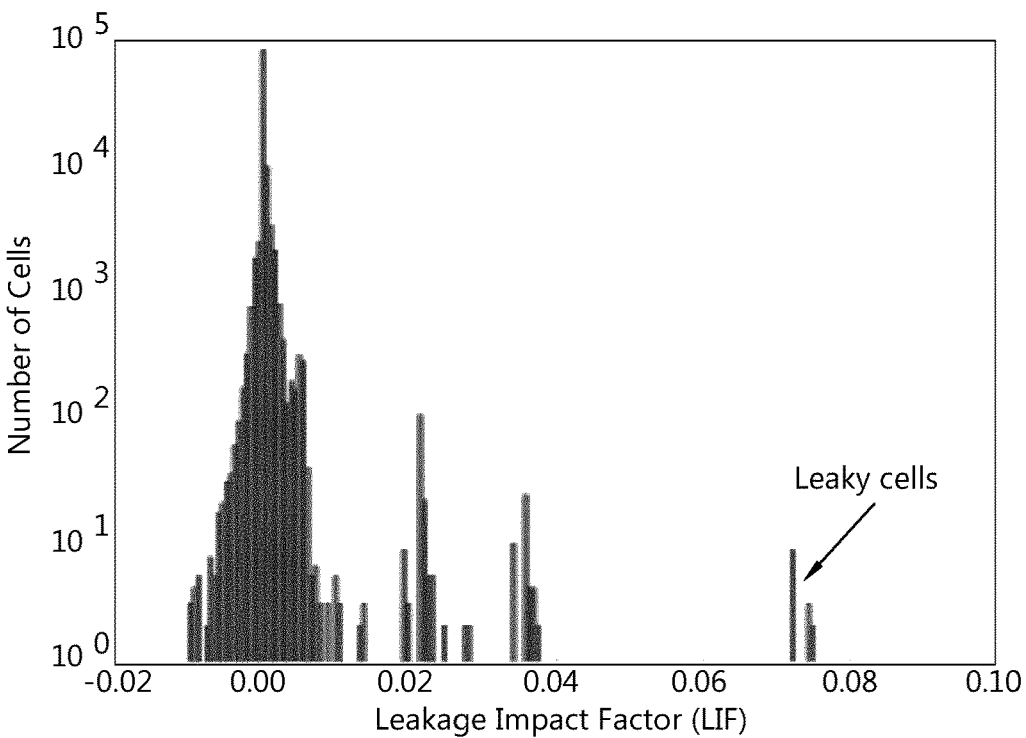
FIG. 5 depicts a graphical view of leakage impact factor distribution for the electronic circuit according to the first example.
Figure 6:
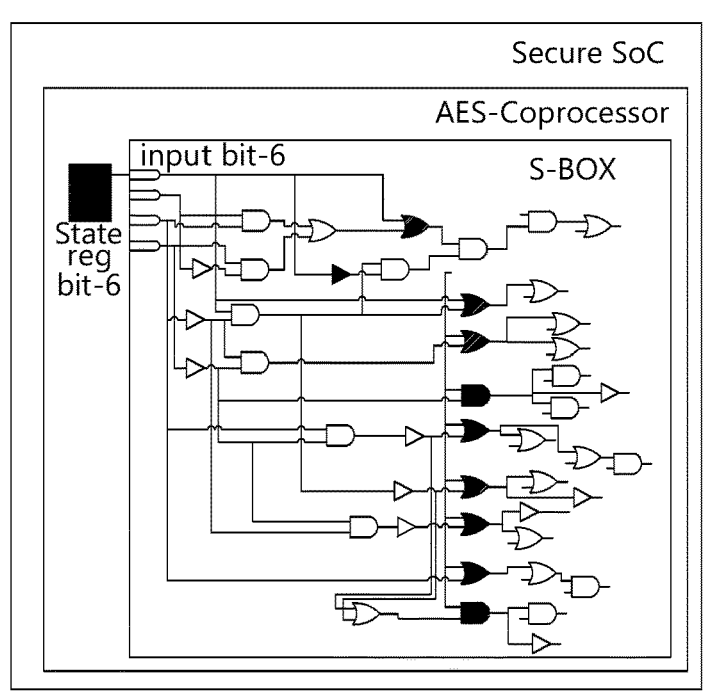
FIG. 6 depicts a circuit diagram of a part of the electronic circuit according to the first example, showing examples of leakage sources.

Results and Analysis: FIG. 5 shows the distribution of the LIF for all the cells in the design, the leaky cells are shown in red. As indicated by the distribution, only a minute number of cells (0.01% of the design), have a high LIF and actually contribute to side-channel leakage for the leakage model chosen. The resultant LIF ranking of cells reveals that the seventh flip-flop of the state register (bit-6) has the highest LIF value suggesting that this flip-flop contributes the most to side channel leakage during the leakage time interval. As the 128 bit state register holds the state of the AES process and is updated after every round, it is no surprise that it should be most leaky net in the coprocessor. Furthermore, the results of the LIF computation reveal that several gates inside the Substitution-box (S-box) leak as well. These gates in the S-box are involved in the substitution operation on bit-6 of the state register, hence causing side-channel leakage. After these signals, there is a sharp decline in LIF values, helping us clearly demarcate the leakage sources. the present implementation of the AES coprocessor utilizes sixteen lookup based S-boxes which contribute to a major chunk of the die area occupied by the coprocessor and hence responsible for power side-channel leakage. FIG. 6 shows a partial schematic of the S-box design. The leaky gates, marked in red take the state register output as input. Observing these results bolsters confidence in the present strategy as it is able to identify sources of leakage in the coprocessor design.

The previous example aimed at analysing the sources of side channel leakage inside the encryption coprocessor. Before the encryption operation in the coprocessor, the inputs—plaintext and encryption key, need to be transferred to the memory mapped interface of the coprocessor. For the following example, the plaintext inputs of encryption are considered as a secure asset. In this case study, GLA identifies the architectural elements which contribute to the leakage of secret input data during the transfer procedure. During the transfer, the secret assets (inputs of encryption) need to flow through various architectural elements. The secure asset transfer spans the LEON3 core, the AMBA AHB bus, the AMBA APB bus and finally reaches the memory mapped register of the coprocessor. The transfer proceeds at word granularity and hence takes approximately fifty clock cycles to complete, leading to a large time window.

GLA procedure: In this example, the single bit Hamming weight of the secure asset is chosen as the present leakage model. As per the used naming convention, one may represent the input data's most significant bit as bit-0, and the least significant bit as bit-127. After performing Power Correlation of the simulated power trace with the leakage model, it is observed that most of the bits have high correlation peaks. However, bit-86 has the highest correlation peak and bit-86 is applied as the GLA analysis target.

Figure 7:
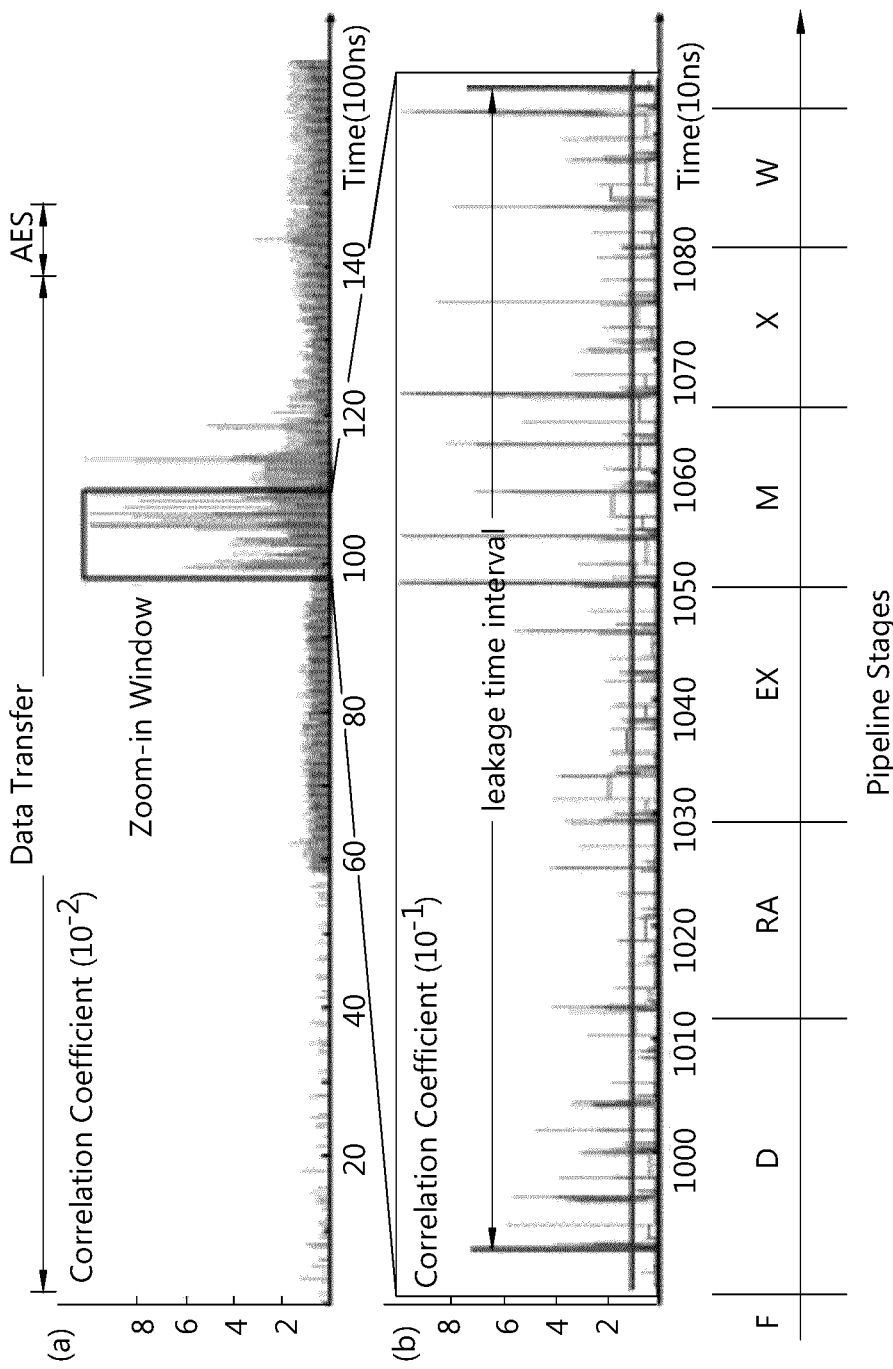
FIG. 7 depicts another correlation diagram illustrating an example of power correlation results relating to the electronic circuit according to a second example

The leakage time interval is a subset of the whole time window of the transfer window where the correlation coefficient value for bit-86 is higher than the threshold of 0.105, as described in the previous case study. The resultant leakage time interval using this threshold is shown in FIG. 7. The leakage time interval identified for this case study is very large and gives us an opportunity to analyse all the architectural blocks in the path traversed by the input data. It has been chosen to analyse the microarchitecture of the LEON3 core by choosing a narrower leakage time interval where the majority of activity happens inside of the LEON3 core. LEON3 core is a sizable contributor of power based side channel leakage during the transfer due to its high complexity and size. GLA can help us identify expected and unexpected architectural elements inside the LEON3 core causing the side channel leakage. Performing Architecture Correlation on this leakage time interval identifies the nets which are consistent with the leakage model. Leakage Impact Factor is computed for the drivers of these nets which allows us to generate a list of cells in order of their leakage impact.

Figure 8:
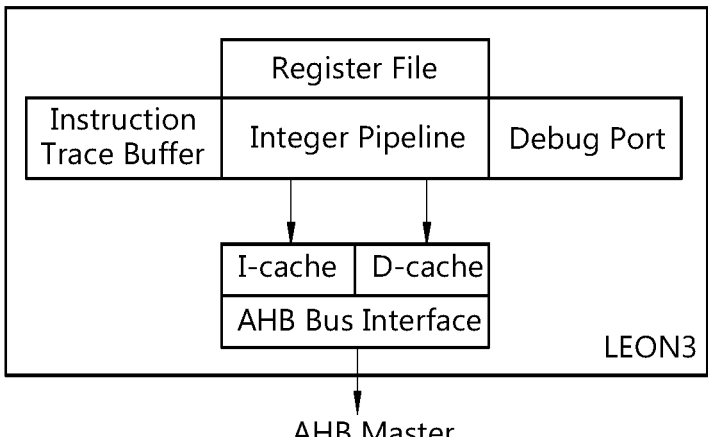
FIG. 8 depicts a block diagram of an electronic circuit according to the second example
Figure 9:
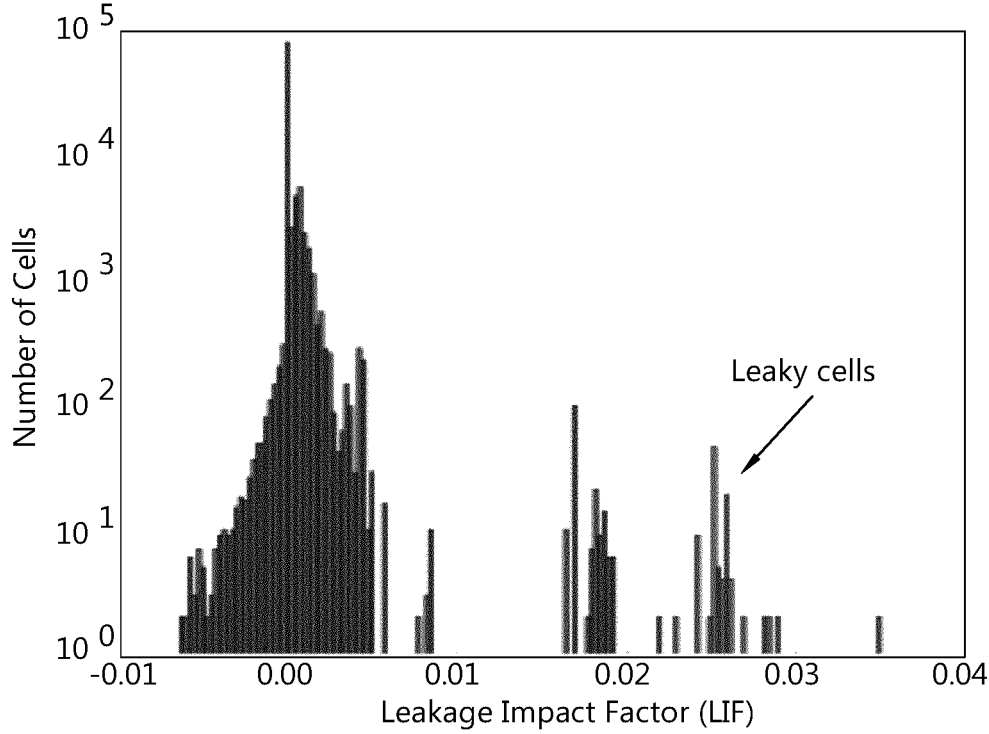
FIG. 9 depicts a graphical view of leakage impact factor distribution for the electronic circuit according to the second example.

Results and Analysis: FIG. 8 shows a block diagram of the LEON3 core. Blocks in red indicate the location of leaky gates pointed out by the result of GLA for the input secure assets. Investigating the results of GLA reveals both expected and unexpected sources of leakage. The usual suspects are present in the results e.g. cells in the register file and the stages of the integer pipeline of LEON3. The leakage sources include flip-flop cells in the register file, in the operand register of the Execution stage and in the result register of the Memory access stage. A single store instruction, which carries the plaintext, is critical to the leakage. FIG. 7 shows the flow of this single store instruction through the seven pipeline stages of LEON3. Distinct peaks can be observed during the leakage time interval as the instruction progresses through the Fetch (F), Decode (D), Register Access (RA), Execution (E), Memory Access (M), Exception (X) and WriteBack (W) stages of the pipeline. Cells in the data cache of LEON3 are pointed out by GLA as sources of side channel leakage. This is unexpected because the data cache is disabled by our testbench before the AES operation to avoid any run to run variations due to timing effects. With the cache disabled, stores of the secure data asset should be directly passed to the memory controller. However, GLA reveals cell activity in the data cache correlating with the secure data asset. Investigation of the specific cells reveals that the leakage is due to a Write Buffer which is integrated in the data cache. The Write Buffer remains active even if the data cache is disabled and is used by LEON3 to ensure that stores do not impede the progress of the execution pipeline by putting pending stores in the Write Buffer. Cells inside the Instruction Trace Buffer (ITB), integrated in the LEON3 core, are another unanticipated source of leakage exposed by GLA on this time window. In the present case, LEON3 contains 1 KiloByte of memory as ITB for storing executed instructions. The ITB is implemented as a circular buffer and can hold up to 64 executed instructions. The source of side channel leakage revealed here are the memory cells in the ITB. The ITB is a source of side-channel leakage due to the present test mechanism where the plaintext data is a part of the operands in a few of the instructions. These retired instructions end up in the ITB after execution. The existence of the ITB further means that the instructions carrying the secure data asset can persist in the LEON3 core for much later than intended. The distribution of the LIF for all the cells in the design is shown in FIG. 9 with the leaky cells indicated in red. Similar to the previous case study, a small percentage of cells (0.1% of the design) have a high LIF and contribute to side-channel leakage for the input data leakage model.

The GLA methodology heavily depends on the choice of a leakage model. By targeting different leakage models, GLA will reveal the leakage sources corresponding to the choice of the leakage model. In this paper, it is assumed that the designer knows a vulnerable leakage model for the design. Applications such as AES have well-known leakage models. For example, the Hamming distance of the adjacent rounds outputs in hardware AES implementation which reveals the side channel leakage during the update of the state register, is a typical leakage model used by attackers to attack AES. Hence, it is a fruitful GLA target for the designer. For analyzing the bus transfer procedure of a microprocessor, the Hamming weight model is chosen because during bus transfer the power consumption dependent on the Hamming weight of the secret data. Even if the designer has no knowledge of what leakage models to use beforehand, exploring vulnerable leakage models for the design is not complex. In the present setup, an iteration is performed through all leakage models (all combinations of input data and intermediate values) of the AES application and choose the leakage model which gives us significant correlation peaks which can then be used for analysis using GLA. Moreover, there are methodologies like GLIFT, Gate Level Information Flow Tracking, which reveal how a secret asset propagates in architecture and can help designers identify an appropriate leakage model.

Bit-wise Correlation vs TVLA: Nowadays, there exist other methodologies, for example Test Vector Leakage Assessment (TVLA) that are commonly used as metrics side channel leakage assessment. These methodologies allow designers to evaluate the side channel leakage of a device without implementing an actual attack and without the knowledge of the vulnerable leakage model. TVLA employs the t-test for side channel leakage evaluation as opposed to correlation used in the present methodology. TVLA shows whether two well-chosen input data sets, when processed by the Device Under Test (DUT), lead to distinguishable side channel leakage information. However, TVLA is a high-level leakage assessment method and is oblivious to the actual source of side-channel leakage. TVLA fails to reflect the actual difficulty of key recovery. Unlike TVLA, the correlation coefficient of a power model is used with simulated power traces, or with measured power traces. The leakage model is calculated from one specific bit of data based on a power model which maps the data to power consumption values. Unlike TVLA, bitlevel correlation is computed from a specific leakage model which has a precise interpretation in terms of the gates in the netlist of our design. This is the main reason why bit-level correlation is used rather than TVLA as the side channel leakage evaluation tool.

Figure 10:
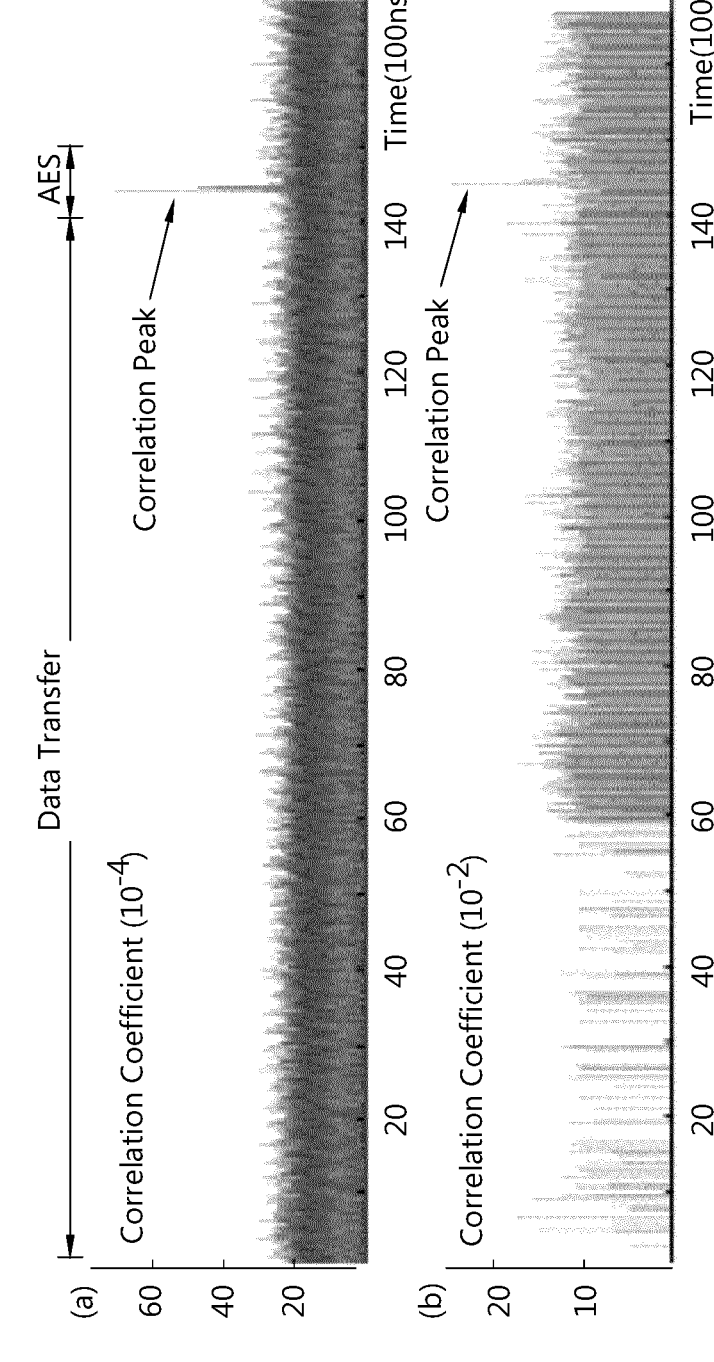
FIG. 10 depicts a correlation diagram illustrating an example of power correlation results relating to the electronic circuit according to the second example.
Figure 11:
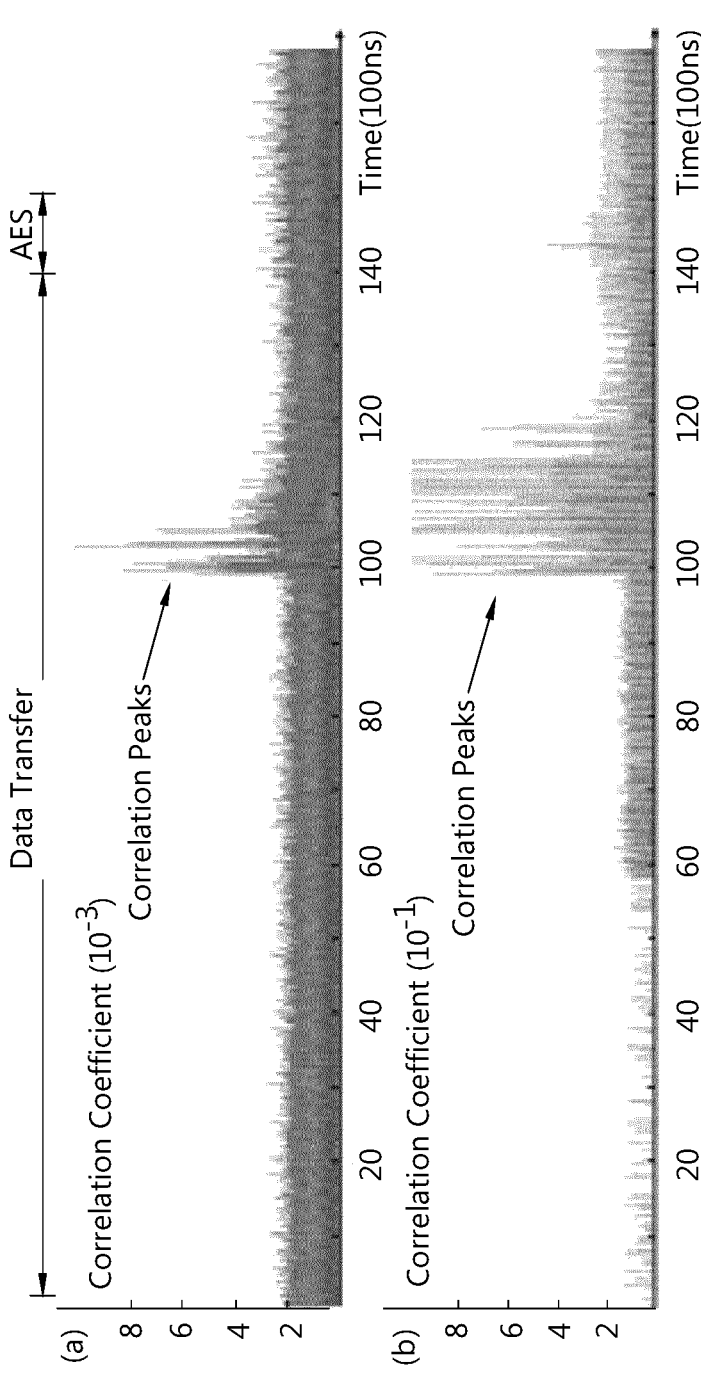
FIG. 11 depicts another correlation diagram illustrating another example of power correlation results relating to the electronic circuit according to the second example.

Comparison with ASIC measurements: FIG. 10(*a*) shows the result of the Power Correlation analysis on the measured trace obtained from the ASIC prototype of the Secure SoC. In order to demonstrate the most leaky bit in one byte, overlapping the correlation traces of all the 8 bits in byte 0 has been performed. FIG. 10(*b*) shows Power Correlation 329.01
Architectural Correlation 17.87
Computation of LIF 14.40
the result of the Power Correlation analysis on simulated traces. In ASIC measurement trace, 500 k traces are needed until a distinguishable peak can be observed. By comparison in simulations, only 500 traces are needed. Gate-level simulations in GLA require fewer traces due to noise intrusion in the measured traces making side channel leakage assessment difficult, while highlighting the advantages of design time side channel leakage assessment using the present approach. In order to evaluate the accuracy of the design time power estimation, the measurement of the ASIC prototype has been taken and compare it with the simulated trace. For the first case study, as demonstrated in the FIG. 10, in terms of the leakage time interval, the time during which correlation peaks appear in the simulated trace is aligned with the time interval in the ASIC prototype measurement. Moreover, in terms of the most leaky bit, is has been observed that both in the ASIC measurement and simulated trace, bit6 is the most leaky one. These observations demonstrate the accuracy of the power estimation of the simulated traces. Similar to the first case study, FIG. 11 shows the result of the Power Correlation analysis, for the Secure asset transfer case study, on the 500 k measured trace obtained from the ASIC prototype of the Secure SoC and 600 simulated traces. Overlapping of the correlation traces of all the 8 bits in the byte-10 has been performed. Correlation with input data can be both observed in the ASIC measurement traces and the simulated traces starting at the same period of time. In terms of the most leaky bit, all the bits have a high correlation coefficient values both in the ASIC and simulated traces. However, as compared to the simulated traces, the measured traces are noisy which leads to fewer and smaller correlation peaks. An increased number of measured traces might enhance the correlation peaks by cancelling out the effect of noise, but again that highlights the advantages of using design-time side channel assessment using the present strategy. In this paper, the post-synthesis netlist has been utilized for side channel leakage assessment and analysis of leakage sources. However, utilizing the post-layout netlist is a modification and can be incorporated in the present methodology.

Runtime evaluation of GLA: The critical path of GLA is broken down into Power Correlation, Architectural Correlation and Computation of the Leakage Impact factors (LIF). The Table 2 indicates the run times for the phases in the GLA procedure for the present design. the present SoC design contains 101873 cells and is exercised by a set of 600 stimuli. The gate-level simulations and power estimation, which are included in Power Correlation, need to be performed only once for each application and can be used for analysis with varying leakage models. The total runtime for GLA depends on the following factors: the complexity of the design, the number of simulated traces and the expansiveness of the leakage time interval. Nevertheless, the time consumed for evaluating the design using GLA is insignificant as compared to the delay and revenue loss caused by a re-spin of the chip.

The invention is further defined by the following numbered clauses which form part of the description:

1. A method of identifying, in a circuit design of an electronic circuit, a source of side channel leakage of the electronic circuit, the method comprising:
    a) simulating over a leakage time interval an operation of the circuit in response to at least one stimulus, thereby deriving for each one of the at least one stimulus per circuit part of the electronic circuit a respective simulated leakage quantity circuit part response over the leakage time interval, the respective simulated leakage quantity circuit part response expressing a leakage of a leakage quantity from the circuit part responsive to the respective stimulus;

b) obtaining for each one of the at least one stimulus an expected leakage quantity response over the leakage time interval from a processing of each one of the at least one stimulus by a leakage model, the leakage model modelling the leakage quantity at a processing of a secure asset;

c) determining, per circuit part, a respective circuit part correlation over the leakage time interval between
    the respective simulated leakage quantity circuit part response to each one of the at least one stimulus, and
    the expected leakage quantity response to each one of the at least one stimulus;

d) ranking the circuit parts based on the circuit part correlations between the respective simulated leakage quantity circuit part responses and the expected leakage quantity responses and e) identifying as the source of side channel leakage the circuit part for which a highest one of the circuit part correlations has been determined between the expected leakage quantity responses and the respective simulated leakage quantity circuit part responses.

2. The method according to clause 1, further comprising determining the leakage time interval by:
    simulating the operation of the electronic circuit to obtain a simulated circuit activity trace of the electronic circuit;
    determining an expected logic sequence from the power leakage model;
    correlating over plural different time intervals the simulated circuit activity trace of the electronic circuit to the expected logic sequence;
    determining the leakage time interval using the time interval of the plural different time intervals exhibiting a highest correlation between the simulated circuit activity trace of the electronic circuit design and the expected logic sequence.

3. The method according to clause 1 or 2, comprising at least two stimuli and wherein c) comprises counting per circuit part a number of stimuli for which the simulated leakage quantity circuit part response corresponds to the expected leakage quantity response to the one of the stimuli.

4. The method according to any one of the preceding clause s, comprising at least two random stimuli, the leakage quantity circuit part response comprises responses to each one of the at least two random stimuli and the expected leakage quantity response by the power leakage model comprises expected leakage quantity responses to each one of the at least two random stimuli.

5. The method according to any one of the preceding clauses, wherein the at least one stimulus comprise a first stimulus and a second stimulus, the method comprising deriving plural leakage quantity circuit part responses per stimulus, determining a statistical difference between the leakage quantity circuit part responses obtained with the first stimulus and the leakage quantity circuit part responses obtained with the second stimulus and establishing if the statistical difference exceeds a predetermined threshold.

6. The method according to any one of the preceding clauses, wherein an aggregated stimulus is provided comprising at least two stimuli, and wherein in the simulation in a) the at least two stimuli are each provided to the circuit part, thereby deriving for each one of the at least two stimuli comprised in the aggregated stimulus, a respective simulated leakage quantity circuit part response from the circuit part of the electronic circuit.

7. The method according to any one of the preceding clauses, wherein the leakage quantity comprises at least one of power consumption and electromagnetic radiation.

8. The method according to any one of the preceding clauses, wherein the simulated leakage quantity circuit part responses comprises simulated circuit part logic states for each one of the at least one stimulus, the expected leakage quantity responses comprising expected logic states for each one of the at least one stimulus, and wherein the respective circuit part correlations are determined as a sum of correlations between the respective simulated circuit part logic state and the respective expected logic states, for each one of the at least one stimulus.

9. The method according to any one of the preceding clauses, wherein in c) the circuit part correlations are each multiplied by a respective weight factor, the respective weight factor representing a power consumption of a logic gate of the respective circuit part.

10. The method according to any one of the preceding clauses, wherein the leakage model is configured to output a sequence of subsequent logic states responsive to the respective stimulus.

11. The method according to any one of the preceding clauses, wherein the secure asset is a predetermined encryption key or a predetermined decryption key, the leakage model being configured to model the processing of the predetermined encryption key or predetermined decryption key.

12. The method according to any one of the preceding clauses, wherein the method comprises determining, using the power leakage model, a Hamming distance between the subsequent logic states.

13. The method according to any one of the preceding clauses, wherein the secure asset is data transmitted by the electronic circuit, the leakage model being configured to model a transmission of the data by the electronic circuit.

14. The method according to any one of the preceding clauses, wherein the method comprises determining, using the power leakage model, a Hamming weight of the subsequent logic states.

15. The method according to any one of the preceding clauses, wherein the circuit parts are logic gates.

16. A method of reducing at a design stage a susceptibility to side channel leakage an electronic circuit, comprising:
    i) providing an electronic circuit design of an electronic circuit comprising plural circuit parts;
    ii) detecting a source of side channel leakage of the electronic circuit according to the method of any of the preceding claims; and
    iii) amending the design of the electronic circuit by reducing a susceptibility to side channel leakage of the circuit part identified as the source of the side channel leakage.

17. The method according to clause 16, further comprising repeating ii) and iii) on the basis of the amended electronic circuit design.

The invention claimed is:

1. A method of identifying, in a circuit design of an electronic circuit, a source of side channel leakage of the electronic circuit, the method comprising:
    a) simulating over a leakage time interval an operation of the circuit in response to at least one stimulus, thereby deriving for each one of the at least one stimulus per circuit part of the electronic circuit a respective simulated leakage quantity circuit part response over the leakage time interval, the respective simulated leakage quantity circuit part response expressing a leakage of a leakage quantity from the circuit part responsive to the respective stimulus;

b) obtaining for each one of the at least one stimulus an expected leakage quantity response over the leakage time interval from a processing of each one of the at least one stimulus by a leakage model, the leakage model modelling the leakage quantity at a processing of a secure asset;

c) determining, per circuit part, a respective circuit part correlation over the leakage time interval between the respective simulated leakage quantity circuit part response to each one of the at least one stimulus, and the expected leakage quantity response to each one of the at least one stimulus;

d) ranking the circuit parts based on the circuit part correlations between the respective simulated leakage quantity circuit part responses and the expected leakage quantity responses and e) identifying as the source of side channel leakage the circuit part for which a highest one of the circuit part correlations has been determined between the expected leakage quantity responses and the respective simulated leakage quantity circuit part responses.

2. The method according to claim 1, wherein each circuit part is a respective gate of the electronic circuit, wherein the simulated leakage quantity circuit part responses comprise simulated logic states of the respective gate for each one of the at least one stimulus, wherein the expected leakage quantity responses comprise expected logic states of the leakage model for each one of the at least one stimulus, wherein the circuit part correlation is determined per gate from a correlation between the simulated logic states of the respective gate for each one of the at least one stimulus and the expected logic states of the leakage model for each one of the at least one stimulus.

3. The method according to claim 1, further comprising determining the leakage time interval by:

simulating the operation of the electronic circuit to obtain a simulated circuit activity trace of the electronic circuit;

determining an expected logic sequence from the power leakage model;

correlating over plural different time intervals the simulated circuit activity trace of the electronic circuit to the expected logic sequence;

determining the leakage time interval using the time interval of the plural different time intervals exhibiting a highest correlation between the simulated circuit activity trace of the electronic circuit design and the expected logic sequence.

4. The method according to claim 1, comprising at least two stimuli and wherein c) comprises counting per circuit part a number of stimuli for which the simulated leakage quantity circuit part response corresponds to the expected leakage quantity response to the one of the stimuli.

5. The method according to claim 1, comprising at least two random stimuli, the leakage quantity circuit part response comprises responses to each one of the at least two random stimuli and the expected leakage quantity response by the power leakage model comprises expected leakage quantity responses to each one of the at least two random stimuli.

6. The method according to claim 1, wherein the at least one stimulus comprise a first stimulus and a second stimulus, the method comprising deriving plural leakage quantity circuit part responses per stimulus, determining a statistical difference between the leakage quantity circuit part responses obtained with the first stimulus and the leakage quantity circuit part responses obtained with the second stimulus and establishing if the statistical difference exceeds a predetermined threshold.

7. The method according to claim 1, wherein an aggregated stimulus is provided comprising at least two stimuli, and wherein in the simulation in a) the at least two stimuli are each provided to the circuit part, thereby deriving for each one of the at least two stimuli comprised in the aggregated stimulus, a respective simulated leakage quantity circuit part response from the circuit part of the electronic circuit.

8. The method according to claim 1, wherein the leakage quantity comprises at least one of power consumption and electromagnetic radiation.

9. The method according to claim 1, wherein the simulated leakage quantity circuit part responses comprises simulated circuit part logic states for each one of the at least one stimulus, the expected leakage quantity responses comprising expected logic states for each one of the at least one stimulus, and wherein the respective circuit part correlations are determined as a sum of correlations between the respective simulated circuit part logic state and the respective expected logic states, for each one of the at least one stimulus.

10. The method according to claim 1, wherein in c) the circuit part correlations are each multiplied by a respective weight factor, the respective weight factor representing a power consumption of a logic gate of the respective circuit part.

11. The method according to claim 1, wherein the leakage model is configured to output a sequence of subsequent logic states responsive to the respective stimulus.

12. The method according to claim 1, wherein the secure asset is a predetermined encryption key or a predetermined decryption key, the leakage model being configured to model the processing of the predetermined encryption key or predetermined decryption key.

13. The method according to claim 1, wherein the method comprises determining, using the power leakage model, a Hamming distance between the subsequent logic states.

14. The method according to claim 1, wherein the secure asset is data transmitted by the electronic circuit, the leakage model being configured to model a transmission of the data by the electronic circuit.

15. The method according to claim 1, wherein the method comprises determining, using the power leakage model, a Hamming weight of the subsequent logic states.

16. The method according claim 1, wherein the circuit parts are logic gates.

17. A method of reducing at a design stage a susceptibility to side channel leakage an electronic circuit, comprising:

i) providing an electronic circuit design of an electronic circuit comprising plural circuit parts;

ii) detecting a source of side channel leakage of the electronic circuit according to the method of claim 1;

iii) amending the design of the electronic circuit by reducing a susceptibility to side channel leakage of the circuit part identified as the source of the side channel leakage; and iv) repeating ii) and iii) on the basis of the amended electronic circuit design.

* * * * *